Nov. 11, 1930. H. JOHNSON 1,781,464
AMUSEMENT RIDE APPARATUS
Filed June 24, 1929  2 Sheets-Sheet 1
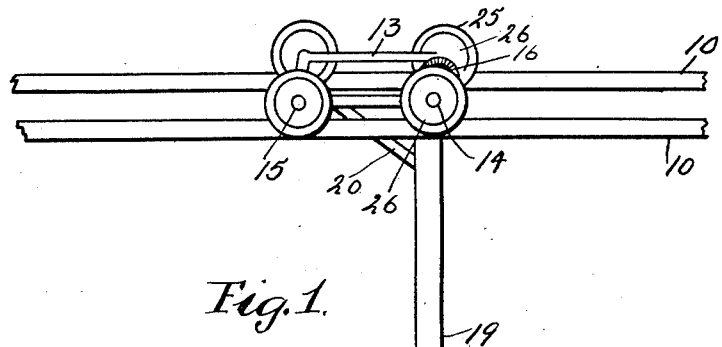
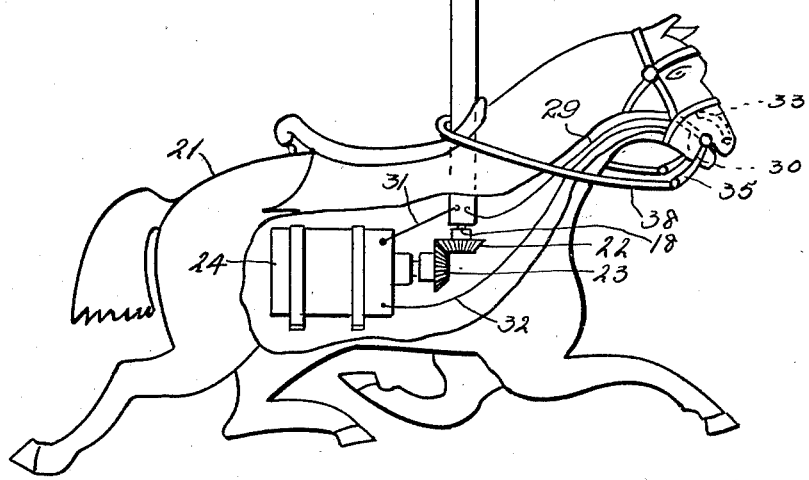
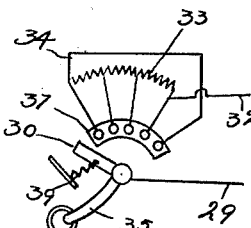
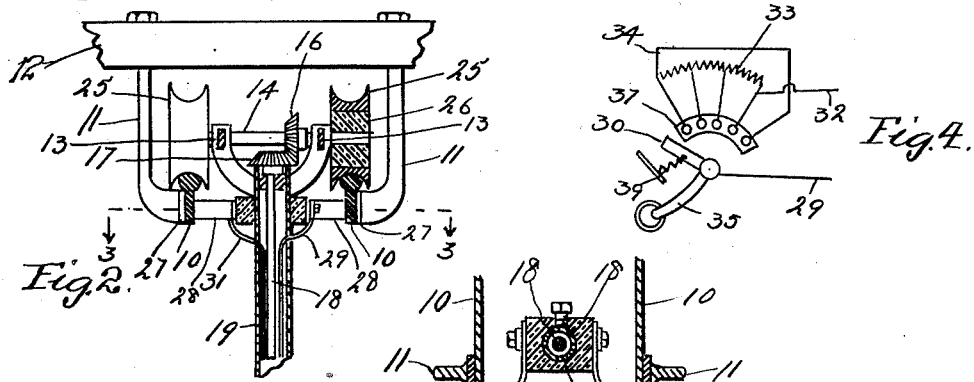
Inventor
Halligan Johnson
By W. W. Williamson
Atty.

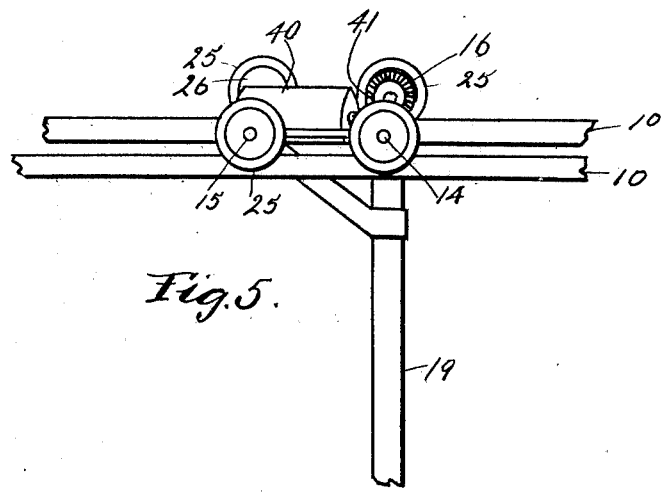
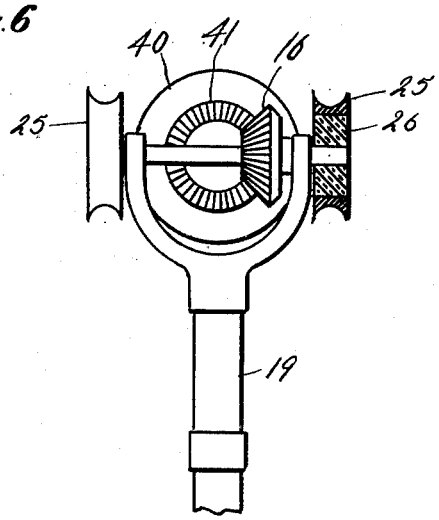

Patented Nov. 11, 1930

1,781,464

UNITED STATES PATENT OFFICE

HALLIGAN JOHNSON, OF SAN DIEGO, CALIFORNIA

AMUSEMENT RIDE APPARATUS

Application filed June 24, 1929. Serial No. 373,304.

My invention relates to a new and entertaining amusement ride apparatus and has for its main object to provide an overhead track, a truck adapted to run upon said track and a figure of a horse suspended from the truck, together with means for propelling the truck and controlling the speed of the latter from the figure.

With these and other objects in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Fig. 1, is a general view showing a double track, a truck mounted thereon and the figure of a horse suspended from the truck, a portion of the figure being broken away to show the motor and drive gearing.

Fig. 2, is a front view of one pair of hangers, the supporting cross beam and the truck, one wheel of the truck and the suspension tubes being in section.

Fig. 3, is a section on the line 3—3 of Fig. 2.

Fig. 4, is a detail view of the bridle controlled switch.

Fig. 5, is an isometrical view of the truck carrying a motor such as used in a slight modification of my invention.

Fig. 6, is an enlarged detail view of the motor, gearing and suspension tube shown in Fig. 5.

In carrying out my invention as embodied in Figs. 1 to 4 inclusive, 10 represents the rails of an overhead track and these rails are supported by the hangers 11 which latter depend from a cross beam 12 of a suitable frame work, a number of these cross beams being placed at a distance apart to properly support said track.

13 represents the body or frame of the truck which may be of a desired design and in this body are journalled the axles 14 and 15, the former having a beveled gear 16 secured thereon with which meshes the beveled gear 17 and this gear 17 is secured on the upper end of the vertical shaft 18 for the purpose hereinafter explained.

19 represents a suspension tube depending from the truck body and held rigid with said body by a bar 20 or in any other convenient manner as will be readily understood; and the lower portion of this tube has secured thereto the figure of a horse 21 in such manner as to properly suspend said figure, the tube terminating inside of the figure.

The shaft 18 is in the tube 19 and has a beveled gear 22 secured to its lower end, which gear meshes with a corresponding gear 23 driven by the electric motor 24, said motor being suitably mounted within the Figure 21 as shown in Fig. 1.

By this arrangement it will be seen that when the motor is put in operation, the shaft 18 will be revolved and consequently the truck will be driven along the track carrying the figure of the horse and its rider forward.

The axle 14 of the truck has secured on the outer ends thereof the truck wheels 25, said wheels being insulated from the axle by the bushings 26 so as to prevent the short-circuiting of the current from one of the rails 10 to the other, these rails being insulated from the hangers 11 by suitable blocks 27 and against the inner surfaces of the rails the brushes 28 bear, forming a part of the circuit which carry the current from one rail to the motor and back to the other rail.

29 represents an insulated wire running from one of the brushes down through the suspension tube 19 to the blade 30 of the switch while the insulated wire 31 leading from the other brush also passes down through the suspension tube and is connected to the motor and from the motor, the wire 32 leads to the terminal coil 33 of the rheostat 34.

The bit levers 35 are secured to the blade of the switch so as to operate said blade across the terminals 37 of the coils of the rheostat and to these levers are attached the bridle reins 38, a spring 39 serving to normally hold the switch blade out of contact with the terminals of the rheostat, thus leaving the motor dead until the switch blade is actuated.

In practice, a number of tracks are parallel and adjacent each other so that a number of horses suspended from the trucks running upon said tracks may be bunched together at a starting point and when the rider has been mounted upon each horse, each rider grasping the bridle and drawing upon the same will put the switch blade of that particular horse first in contact with the first terminal of the rheostat giving the horse a slow forward movement; and by further pulling upon the bridle the speed of the horse is increased since the resistance of the rheostat in the circuit will be reduced.

Should the rider unduly pull upon the bridle, the switch blade will be carried into contact with the last terminal of the rheostat which will throw the entire resistance of the rheostat back into the circuit and thus reduce the speed of that particular horse to its lowest point.

The judgment or experience of the various riders will determine the average speed made by the horses since the rider who holds the blade of the switch upon the next to the last terminal of the rheostat will maintain a maximum application of the motive power to the travel of the horse and this will create considerable competition and excitement and render the operation of the apparatus highly amusing.

In Figs. 5 and 6 I have shown a slight modification of my invention in which a motor 40 is mounted directly upon the truck, the shaft of said motor carrying a beveled gear 41 which meshes with the beveled gear 16 thus driving the truck without the necessity of the intervening shaft 18 and in this construction, suitable wires, such as 29 and 31 of Fig. 1 may extend downward through the suspension tube 19 to the bridle switch and back to the motor, as will be readily understood.

It is obvious that various changes in construction may be made and therefore I do wish to be limited to the exact details of construction as herein shown, as these may be varied within the limits of the appended claims without departing from the spirit of my invention.

Having thus fully described my invention, what I claim as new and useful is:—

1. An amusement apparatus comprising a track adapted to convey an electric current, a truck mounted upon said track, a suspension tube depending from the truck, a figure secured to the lower portion of said tube, an electric motor mounted in the figure, a shaft journalled in said tube and geared to said motor, means for gearing said shaft to the drive axle of the truck, a rheostat mounted within the figure, a switch blade for coacting with said rheostat, and means for operating said switch blade by reins in the reach of the rider of said figure.

2. The herein described apparatus consisting of a pair of overhead rails, a truck adapted to travel upon said rails, a suspension tube depending from said truck, a figure of a horse secured to the lower end of said tube, a shaft journalled in the tube, gearing connecting said shaft to the drive axle of said truck, an electric motor mounted in the figure, gearing connecting said motor with said shaft, a rheostat, wires including the motor and rheostat in the electric circuit with the rails, and means for actuating the switch of the rheostat by the manipulation of the reins of the bridle of the figure of the horse.

In testimony whereof, I have hereunto affixed my signature.

HALLIGAN JOHNSON.